United States Patent [19]

Graves

[11] Patent Number: 4,922,652
[45] Date of Patent: May 8, 1990

[54] SHELTER FOR TREES
[75] Inventor: James P. Graves, Sutton, England
[73] Assignee: Rolinx Limited, Manchester, England
[21] Appl. No.: 805,875
[22] Filed: Dec. 6, 1985
[30] Foreign Application Priority Data
  Dec. 20, 1984 [GB] United Kingdom ............... 8432198
[51] Int. Cl.⁵ .............................................. A01G 13/10
[52] U.S. Cl. ...................................................... 47/23
[58] Field of Search .................. 47/23, 24, 25, 26, 27, 47/32, 30

[56] References Cited
U.S. PATENT DOCUMENTS 494,874  4/1893  Majola ................................... 47/23
  784,684  2/1904  Karlsen .................................. 47/23
1,098,586  6/1914  Oters ..................................... 47/30
4,268,992  5/1981  Scharf, Sr. ............................. 47/23

FOREIGN PATENT DOCUMENTS 15984  of 1895  United Kingdom .................... 37/30
2104366  3/1983  United Kingdom .................... 47/26

Primary Examiner—Robert A. Hafer
Assistant Examiner—B. Lewis
Attorney, Agent, or Firm—Fiddler & Levine

[57] ABSTRACT

A tree shelter comprises two parts joined by clips along a longitudinal axis. Each part comprises a funnel portion and a base portion. Each funnel portion is formed to allow the shelter to mimick the natural bending of a tree stem under the action of wind and is contoured internally to increase the area available for condensation and evaporation of moisture. Each base part is formed to restrict growth of weed around the base of the sheltered tree. The shelter acts to protect the tree whilst permitting its natural growth in its early years.

12 Claims, 2 Drawing Sheets

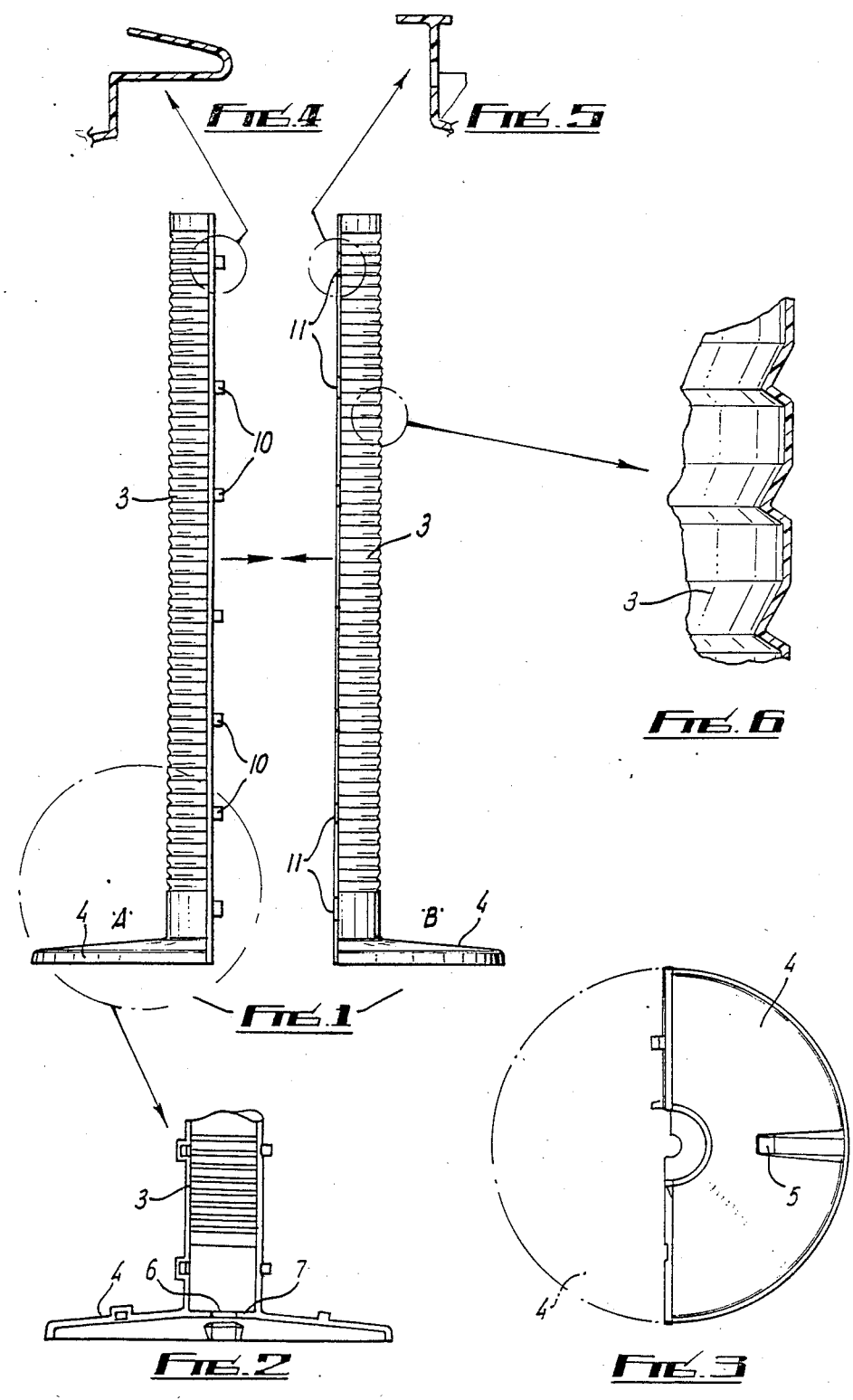

SHELTER FOR TREES

The present invention relates to a shelter particularly, but no exclusively, for trees or other slender plantlife.

The most vulnerable time in the life of a tree is usually the period directly after planting whilst the tree establishes itself. Care must be taken to protect the young tree not only from the ravages of the weather, but also from the encroachment of surrounding vegetation. Tree shelters are known of generally tubular shape. Although they can protect the tree satisfactorily, they can be difficult to remove after the tree has grown to a sufficient size and this may result in damage to the tree. Furthermore it has been found that the tree protected by this form of shelter does not develop sufficient thickness of trunk due it is though to the rigidity of the shelter preventing flexing of the tree under the action of the wind.

According to one aspect of the present invention, there is provided a shelter of tubular form comprising a base and constructed to permit flexing about the base.

According to another aspect of the present invention, there is provided a shelter of tubular form consisting of two parts adapted to be joined along a line extending in the direction of the axis which is upright in use.

According to a third aspect of the present invention, there is provided a method of protecting a tree including the steps of placing one part of a tree shelter adjacent the tree to partially encompass the tree, placing another complementary part of the shelter adjacent the tree to encompass the tree in conjunction with the first part and fastening the parts to the ground.

In a preferred embodiment, the parts advantageously comprise base and funnel portions. The funnel portions are of bellows form to impart the desired degree of flexibility. Clips are provided on respective parts to enable them to be joined together. An apertured flange is provided at the base of the funnel to restrict the upward growth of weeds. The base portions extend from the funnel portions over a wide area, are opaque and of minimum depth all to inhibit the growth of weeds around the base of the tree.

In order that the invention may be more clearly understood, one embodiment of the invention will now be described, by way of example, with reference to the accompanying drawings, in which:

FIG. 1 is a elevational view of a tree shelter showing the constituent parts disconnected and spaced from one another.

FIG. 2 is a partial view of the shelter of FIG. 1 showing the two parts connected.

FIG. 3 is a plan view of the base of one of the parts of the shelter of FIG. 1,

FIGS. 4, 5 and 6 are detail views of portions of the shelter of FIG. 1, and

Figure 7:
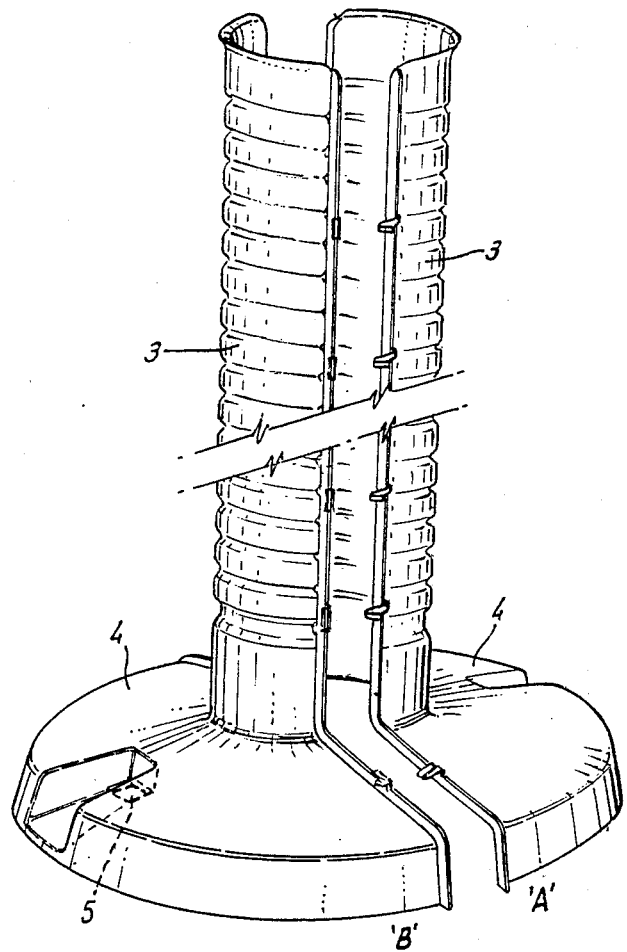
FIG. 7 is an exploded perspective view of the shelter.

Referring to the drawings, the shelter comprises two complementary injection moulded synthetic plastics material parts A and B which, when connected together, form a funnel a base. Each part A, B has an upright funnel portion 3 and a base part 4 which extends horizontally of the funnel. Complementary clip parts 10 and 11 are provided on respective parts. Both parts may be moulded at the same time, or each part individually. The wall of each funnel portion 3 is specially formed (see FIG. 6 in particular) to allow the shelter to mimick the natural bending or wind action of a tree stem and convey this to the growing tree. It is agreed that this will allow the tree trunk to thicken in the normal way and thus be self-supporting when the shelter is finally removed.

The wall of each funnel portion is also contoured to allow water vapor—caused by the "green house" effect to have a minimum of 30% extra surface area to condense and evaporate to ensure an overall moisture content within the funnel. (Smooth walls would simply encourage water to collect at the base causing a continuous damp area for mould to collect).

Each base part 4 is provided with an aperture 5 for receiving a ground retaining peg (not shown) when the shelter is in position. The base part is wide, restricted in depth and made of opaque material to curtail the growth of weed around the base of the tree. Also, the dimension of the aperture 6 in the flange 7 in the bottom of the funnel is carefully chosen to restrict the growth of any weed at the base up the trunk of the tree. Weeds growing around the base of the tree will compete with the tree for the nutrients in the same soil area.

In one form of the shelter the following dimensions have been found advantageous:

| | |
|---|---|
| diameter of base | 388 mm |
| diameter of funnel | 90 mm |
| spacing of the clip parts along the funnel | 96 mm |
| Part A depth of clip parts | 25 mm |
| Part B depth of clip parts | 15 mm |
| Total height | 1.2 meter |

In use, the young tree is planted and one half of the shelter staked in place so that the tree stem is located in the area of the hole in the flange 7 or rib at the base 4 of the shelter.

This shelter half is located and held in the ground by passing a "Tent peg" through the hole 5 in the wide base 4. The second half of the shelter is then located in the same way and clipped to the first half by means of clip parts 10 and 11 and a second peg used to retain the base of this second half.

The mannual clipping together and unclipping apart of the parts facilitates removal of the shelter. This in turn reduces the risk of damage to the tree and also renders the shelter reusable providing the material of the shelter has not deteriorated. Further, the unclipping of the parts will facilitate their transport to and from site.

It will be appreciated that the above embodiments have been described by way of example only and that many variations are possible without departing from the scope of the invention.

I claim:

1. A method of protecting a tree including the steps of placing one part of a flexible walled tree shelter adjacent the tree to partially encompass the tree, placing another complementary part of the flexible walled shelter adjacent the tree to encompass the tree in conjunction with the first part and fastening the parts to the ground.

2. A tree shelter for protecting the trunk of a growing tree, said shelter comprising:

a flexible walled funnel having a longitudinally extending separation, said funnel dimensioned to permit it to be positioned about the base of the trunk of a tree to be protected, and formed with sufficient flexibility to mimic the natural bending of the tree; and a base secured to and extending out from the normally lower end of said funnel.

3. A tree shelter as in claim 2 in which said funnel is formed of a flexible bellows to provide desired flexing.

4. A tree shelter as in claim 2, in which said funnel is formed of two separable funnel parts.

5. A tree shelter as in claim 2 in which clip parts are provided on the edge of the separation of the funnel to permit selective joinder of the funnel edges when the funnel is positioned about the tree trunk.

6. A tree shelter as in claim 2 in which said base is formed integrally with said funnel and is provided with an opening to accommodate a peg for securing the base to the ground.

7. A tree shelter as in claim 3 in which each funnel part has a base part.

8. A tree shelter as in claim 3 in which said bellows are formed with some surfaces spaced from the tree trunk to provide a condensation and evaporation area.

9. A tree shelter as in claim 2 in which said base is opaque.

10. A tree shelter for protecting the trunk of a growing tree, said shelter comprising a two part flexible walled funnel, each part dimensioned to extend longitudinally along opposite sides of the part of the tree to be protected, said funnel parts contoured in the shape of a flexible bellow of sufficient flexibility to permit the protected part of the tree to flex in the wind; and clip parts extending between said funnel parts to permit selective coupling of said funnel parts to each other about the tree.

11. A tree trunk shelter as in claim 10 in which a base is extended out from one end of each funnel part.

12. A tree trunk as in claim 11 in which each funnel part and base is symmetrical and molded of plastic.

* * * * *

UNITED STATES PATENT AND TRADEMARK OFFICE
CERTIFICATE OF CORRECTION

PATENT NO. : 4,922,652

DATED : May 8, 1990

INVENTOR(S) : James Philip Graves

It is certified that error appears in the above-identified patent and that said Letters Patent is hereby corrected as shown below:

In column 1, line 2, "no" should be --- not --- ;

line 17, "though" should be --- thought --- .

Signed and Sealed this

Sixth Day of August, 1991

Attest:

HARRY F. MANBECK, JR.

*Attesting Officer*      *Commissioner of Patents and Trademarks*